(12) United States Patent
Betthauser et al.

(10) Patent No.: US 12,314,835 B2
(45) Date of Patent: May 27, 2025

(54) GRAPH NEURAL NETWORK FOR SIGNAL PROCESSING

(71) Applicant: Microsoft Technology Licensing, LLC, Redmond, WA (US)

(72) Inventors: Leo Moreno Betthauser, Sammamish, WA (US); Ziyao Li, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1105 days.

(21) Appl. No.: 17/149,941

(22) Filed: Jan. 15, 2021

(65) Prior Publication Data

US 2022/0230053 A1 Jul. 21, 2022

(51) Int. Cl.
*G06N 3/045* (2023.01)
*G06N 3/082* (2023.01)

(52) U.S. Cl.
CPC ............. *G06N 3/045* (2023.01); *G06N 3/082* (2013.01)

(58) Field of Classification Search
CPC ................................ G06N 3/045; G06N 3/082
See application file for complete search history.

(56) References Cited

U.S. PATENT DOCUMENTS

2021/0334896 A1* 10/2021 Sarshogh ............... G06Q 40/03

OTHER PUBLICATIONS

Mai, S., Xing, S., He, J., Zeng, Y., & Hu, H. (Dec. 2020). Analyzing unaligned multimodal sequence via graph convolution and graph pooling fusion. arXiv preprint arXiv:2011.13572. (Year: 2020).*
Chen, Y., Lin, X., Ge, K., He, W., & Li, D. (Jun. 2020). Tag Pollution Detection in Web Videos via Cross-Modal Relevance Estimation. In 2020 IEEE/ACM 28th International Symposium on Quality of Service (IWQoS) (pp. 1-10). IEEE. (Year: 2020).*
Wang, X., & Gupta, A. (Oct. 2018). Videos as space-time region graphs. In Proceedings of the European conference on computer vision (ECCV) (pp. 399-417). (Year: 2018).*

(Continued)

*Primary Examiner* — Michael J Huntley
*Assistant Examiner* — Maggie Thanh Maido
(74) *Attorney, Agent, or Firm* — Workman Nydegger

(57) ABSTRACT

Creating a machine learning graph neural network configured to process signals. A method includes identifying a plurality of machine learning graphs where each of the machine learning graphs are for different types of data. The method further includes receiving input identifying shared content of different machine learning graph nodes from different graphs in the plurality of machine learning graphs. The method further includes creating a combined machine learning graph neural network, configured to process signals, using the plurality of machine learning graphs based on the shared content, the combined machine learning graph neural network comprising nodes corresponding to nodes in the plurality of machine learning graphs such that output from the combined machine learning graph neural network comprises outputs generated based on relationships of nodes in the combined machine learning graph corresponding to nodes in different machine learning graphs in the plurality of machine learning graphs.

20 Claims, 7 Drawing Sheets

(56) References Cited

OTHER PUBLICATIONS

Li, Y., Yuan, Y., Wang, Y., Lian, X., Ma, Y., & Wang, G. (Aug. 2020). Distributed multimodal path queries. IEEE Transactions on Knowledge and Data Engineering, 34(7), 3196-3210. (Year: 2020).*

Scarselli, F., Gori, M., Tsoi, A. C., Hagenbuchner, M., & Monfardini, G. (Dec. 2008). The graph neural network model. IEEE transactions on neural networks, 20(1), 61-80. (Year: 2008).*

Hsu, J. L., & Huang, C. C. (Jul. 2015). Designing a graph-based framework to support a multi-modal approach for music information retrieval. Multimedia Tools and Applications, 74(15), 5401-5427. (Year: 2015).*

Miura, Y., Taniguchi, M., Taniguchi, T., & Ohkuma, T. (Jul. 2017). Unifying text, metadata, and user network representations with a neural network for geolocation prediction. In Proceedings of the 55th Annual Meeting of the Association for Comp Linguistics (vol. 1: Long Papers) (pp. 1260-1272). (Year: 2017).*

Fan, S., Zhu, J., Han, X., Shi, C., Hu, L., Ma, B., & Li, Y. (Jul. 2019). Metapath-guided heterogeneous graph neural network for intent recommendation. In Proceedings of the 25th ACM SIGKDD international conference on knowledge discovery & data mining (pp. 2478-2486). (Year: 2019).*

You, J., Ying, R., & Leskovec, J. (May 2019). Position-aware graph neural networks. In International conference on machine learning (pp. 7134-7143). PMLR. (Year: 2019).*

Misraa, A. K., Kale, A., Aggarwal, P., & Aminian, A. (Oct. 2020). Multi-modal retrieval using graph neural networks. arXiv preprint arXiv:2010.01666. (Year: 2020).*

Gao, et al., "Multi-Modal Graph Neural Network for Joint Reasoning on Vision and Scene Text", In Proceedings of IEEE/CVF Conference on Computer Vision and Pattern Recognition, Jun. 13, 2020, pp. 12743-12753.

Mai, et al., "Analyzing Unaligned Multimodal Sequence via Graph Convolution and Graph Pooling Fusion", In Repository of arXiv:2011.13572v2, Dec. 2, 2020, 14 Pages.

"International Search Report and Written Opinion Issued in PCT Application No. PCT/US21/062313", Mailed Date: Apr. 4, 2022, 15 Pages. (MS# 409269-WO-PCT).

Wei, et al., "MMGCN: Multi-Modal Graph Convolution Network for Personalized Recommendation of Micro-Video", In Proceedings of the 27th ACM International Conference on Multimedia, Oct. 21, 2019, pp. 1437-1445.

Zhu, et al., "Collective Multi-Type Entity Alignment Between Knowledge Graphs", In Proceedings of The Web Conference, Apr. 20, 2020, pp. 2241-2252.

* cited by examiner

GRAPH NEURAL NETWORK FOR SIGNAL PROCESSING

BACKGROUND

Background and Relevant Art

Computers and computing systems have affected nearly every aspect of modern living. Computers are generally involved in work, recreation, healthcare, transportation, entertainment, household management, etc.

Neural networks are computing systems which include models and graphs and perform processing based on the models and graphs. Typically, such processing involves receiving input, evaluating the input, and outputting results that are in some fashion related to the input. Thus, for example, such processing can often be characterized as a search. The graphs comprise nodes interconnected by weighted edges. The nodes and edge connections are the result of machine learning training. Such training may involve, for example (in a supervised model), providing input and identifying expected output from the input and using various types of analysis to construct operational graphs between the inputs and outputs that cause the outputs from the inputs. New inputs input into systems using the graphs cause output consistent with the constructed graphs. Thus, a trained model can be used to perform computing operations based on previous data used to train the model.

Deep learning model training today outputs embeddings as representatives for a vast range of data. The embeddings are used in graph formation and node connection via edges. An embedding is a mapping of a variable to a vector representation. That is, a variable is mapped to a multidimensional vector. The embeddings are relevant within a given scope, where a given scope is contextual to a type of data. For example, a scope might be images. Another scope might be text. Another scope might be sound. Another scope might be molecular structures. Another scope might be geographical maps. And so forth. Thus, there are virtually unlimited scopes (and corresponding types of data). Thus, a given embedding is particular to a given trained model. However, examination of a particular embedding, without context of the particular scope with which it associated, is often meaningless. That is, the embedding is not readily interpretable without knowing the scope to which it applies and how the embedding applies to the scope.

Trained neural networks are thus associated with various embeddings. Within a particular scope, similar (by vector distance) embeddings represent similar variables and thus can be coupled by the weighted edges. Thus, nearest neighbors, and thus nearest variables and concepts can be identified within a scope by comparing embeddings within the scope. This allows for corresponding machine learning models to be used to perform computing processing based on the relationships.

However, the lack of inter-scope interpretability makes these representations meaningless outside the scope of the data which the model was trained. That is, embeddings for one trained model are meaningless in the scope of a different trained model, even when those embeddings in different models represent the same or similar concepts. Further, there does not exist an interpretable approach to compare information using these representatives even when the embeddings are from the same embedding space. For example, how would one compare a sentence with an image when embeddings for such were created in different scopes with different normalization of vectors?

Previously, knowledge graphs have been used to search different scopes. For example, a knowledge graph may store information indexing tags or keywords across different scopes. A user search can then be evaluated within the knowledge graph to identify the scopes to be searched. However, search results will still be related by scope, and not directly related based on neural network processing between scopes. For example, consider performing a web search on one or more of the popular search engines. A user can input search terms. As a result of the search engine using a knowledge graph to identify different scopes, the user then has the opportunity to view results from a webpage scope, a video scope, an image scope, a book scope, etc., but the results from different scopes are related only within a given scope. That is, while the results in the different scopes may be related by the search terms used, the results in different scopes are not necessarily presented in a way that ranks and orders consistently across scopes. Stated differently, knowledge graphs might be used to take a single search and turn it into four different independent searches, one for each scope, where the results are then aggregated after the four searches. This results in search results that may be disjointed on scope boundaries, as there is no logic ensuring their consistency across the different scopes. While in many cases, this may be sufficient as the consistency occurs somewhat naturally based on the original search terms, in many other cases, this results in systems that require significant additional user interaction to locate the most relevant search results to a particular user. For example, extremely relevant results to the particular user, in a particular search context, may occur as the first results in a web page search, while less relevant results occur first in an image search.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for creating a machine learning graph neural network configured to process signals. A method includes identifying a plurality of machine learning graphs where each of the machine learning graphs are for different types of data. The method further includes receiving input identifying shared content of different machine learning graph nodes from different graphs in the plurality of machine learning graphs. The method further includes creating a combined machine learning graph neural network, configured to process signals, using the plurality of machine learning graphs based on the shared content, the combined machine learning graph neural network comprising nodes corresponding to nodes in the plurality of machine learning graphs such that output from the combined machine learning graph neural network comprises outputs generated based on relationships of nodes in the combined machine learning graph corresponding to nodes in different machine learning graphs in the plurality of machine learning graphs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
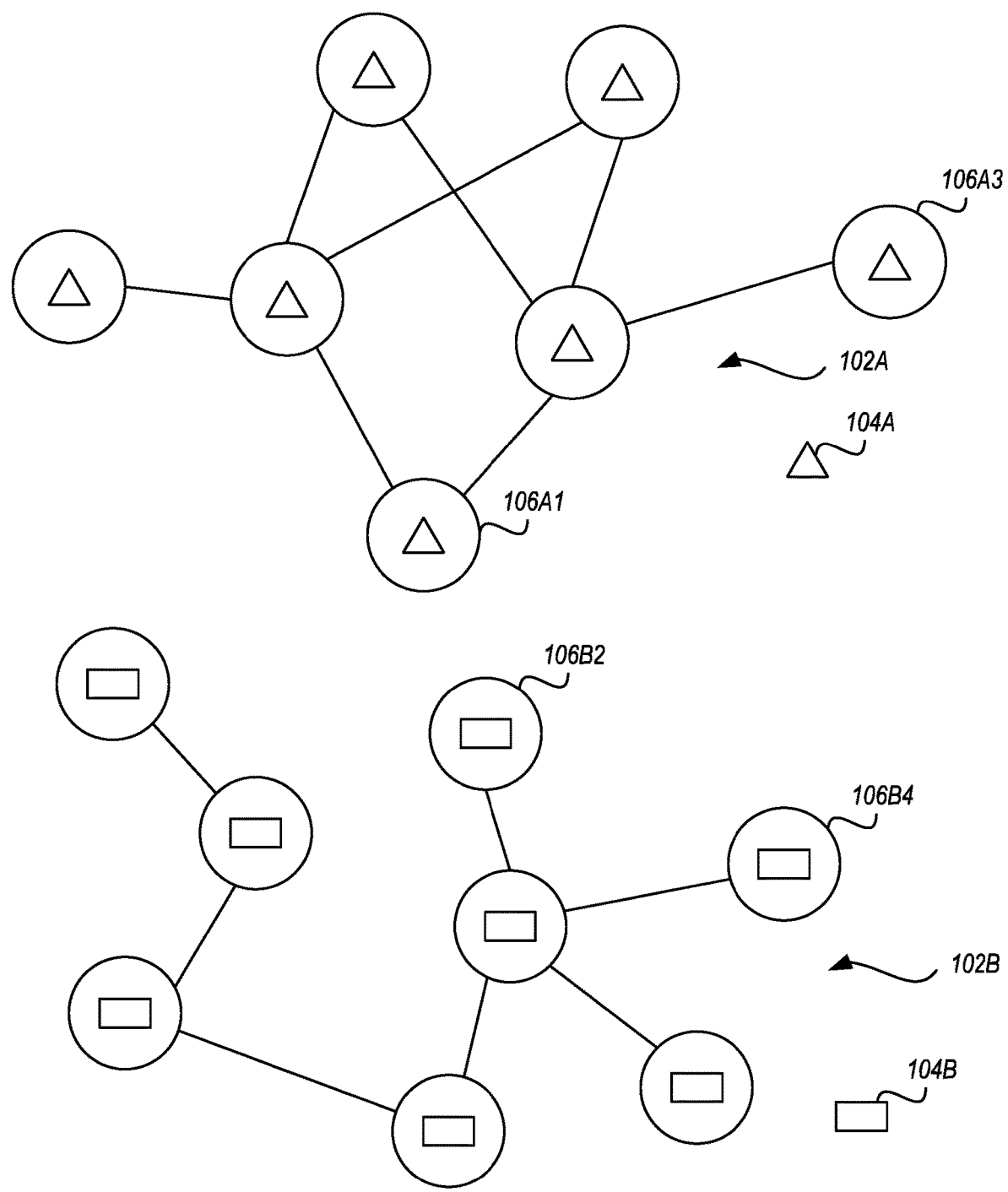
FIG. 1 illustrates machine learning graphs for machine learning models.
Figure 2:
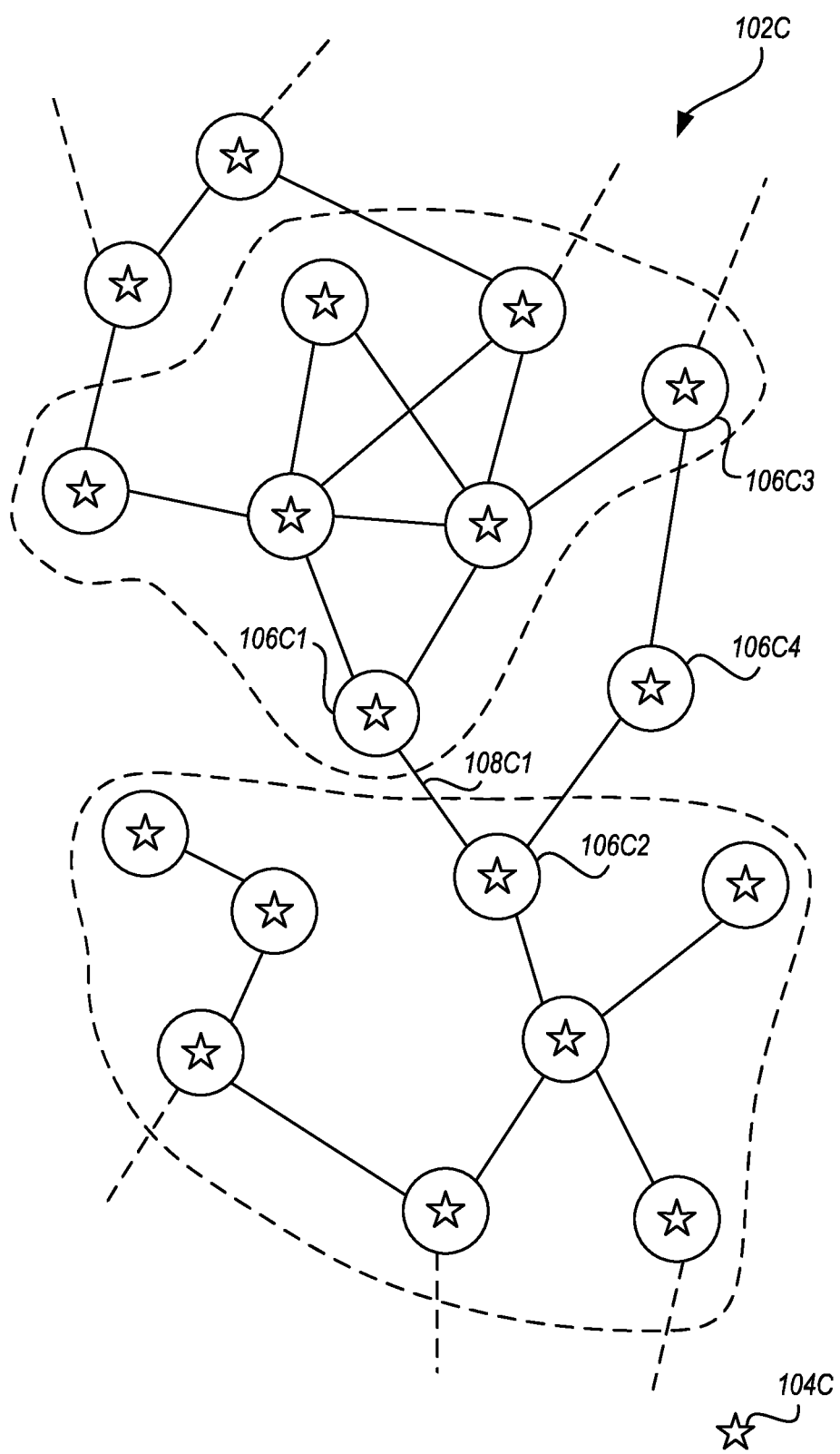
FIG. 2 illustrates a new machine learning graph for a graph neural network with nodes corresponding to the nodes in the machine learning graphs of FIG. 1.

Embodiments illustrated herein use an atlas index in the mathematical sense as a heuristic by finding, for each input model, from among a plurality of input models being used to create a combined overall model, a common manifold whose charts (local neighborhoods) minimally distort the distances of the original input model for the given data type. To accomplish this, embodiments construct a new graph including the union of weighted k-nearest neighborhood graphs to combine the information from multiple deep learning models and then leverage a graph neural network to embed the nodes of the graph into a single and comparable embedding space. That is, embodiments take as input different machine learning graphs for different data types and scopes, having corresponding embeddings relevant to those scopes, while being (without additional context) irrelevant to other scopes, and create a new machine learning graph neural network incorporating nodes corresponding to the input machine learning graphs. However, the new machine learning graph neural network comprises embeddings relevant to the global scope of the new machine learning graph neural network, thus allowing processing over nodes (in the new machine learning graph neural network) corresponding to nodes from different scopes (in the input graphs). For example, FIG. 1 illustrates graphs 102A and 102B for different scopes while FIG. 2 illustrates a graph 102C with nodes corresponding to the nodes in graphs 102A and 102B, but within a common scope.

One obstacle to such an approach is that initially there are disconnected subgraphs (one for each input model) which lack global scope in the new machine learning graph neural network embedding. That is, embeddings for different models are not directly comparable due to their varying representations, as described previously. To address this, embodiments can leverage other external information to identify shared (or at least similar within some predetermined threshold) content between different graphs from different scopes. Shared content as used herein can be identical concepts in different graphs, concepts that are within a predetermined similarity, concepts determined by user input to be similar, or combinations thereof. The external information may be used to implement a mathematical atlas, which can be used to construct a new machine learning graph neural network. The external information can be provided by user inputs such as implicit signals (e.g., cooccurrence of data from consecutive searches), explicit signals (e.g., a user tagging data in different scopes with the same tags), generic taxonomies (e.g., models trained on broad categories such as ImageNet or WordNet), etc. to join similar input data (e.g., as determined by comparing tags for the input data) across models regardless of data type (and thus scope) thus providing understanding of conceptual information in each embedding space. This results in a single knowledge graph as part of the new machine learning graph neural network whose edges encode the underlying model information in the form of edge types and edge weights which connects data of various data types (text, image, graph, sound, language, chemical formulas, etc.) into a single model.

In some embodiments, after constructing a global graph, embodiments then embed each vertex with a particular type of graph neural network known as a positional-aware graph neural network designed to preserve geodesics (shorted paths) within the graph. In particular, position aware graph neural networks instill not only structural integrity (which preserves similarity between nodes of the input graphs) but also global fidelity (which preserves nodes positions within the larger graph). This yields an output embedding which minimizes distortion with respects to the original input similarity while still leveraging the extrinsic information used to connect the original input graphs. This results in finding a useful alignment of the signal types without disregarding the original input information. The result of this is a common embedding for all input data types, irrespective of the graph where they originated, which can now be directly compared using standard distance metrics (such as Lj-distance [where j is an integer or infinity] or cosine-similarity) without using graph traversal.

Further, by utilizing a graph neural network, embodiments can compute embeddings at inference time utilizing just the local neighborhood and tag information which allows similarity searches across data type by referencing only the input data type's model and the atlas index itself.

The technical differences of some embodiments of this approach versus a standard knowledge graph is that embodiments do not need to store a knowledge graph since there is no graph traversal at inference time, rather embodiments explicitly reconstruct k-nearest neighbor graphs from embedding information just in time. Another advantage is that by being able to call the underlying model for the k-nearest neighbors, embodiments often get richer contextual information than unseen data being inserted into a standard knowledge graph which would have to have neighborhood edge sets explicitly mined. Embodiments illustrated herein simply query for additional similar outputs (up to the scale of the input data of the underlying text model such as Bidirectional Encoder Representations from Transformers (BERT)). Also, by leveraging a position aware graph neural networks to embed, the similarity result is a combination of two components. The first component is the distance of the queried data from the known set of tags (i.e., a global understanding of how the model data fit as subgraphs in the larger training graph). The second component is the underlying model embedding which affects the strength of the signal coming from the data's nearest neighbors (i.e., local behavior).

Further, training tagged information has the potential of utilizing similarity from a theoretical data type A to improve the understanding/structuring of a theoretical data type B by passing information across the tagged edges during training. Therefore, reinforcement learning can be leveraged to insert new tags thus propagating user desired structure across largely unstructured databases (where the structure would decay based on model similarity to a tagged piece of information in the underlying data).

One advantage of this approach over other graph embedding methods is that inference can be performed on unseen data using just the local neighborhoods; whereas standard graph embedding approaches cannot take in unseen data (even if the neighborhood includes seen data) as it changes the input signals as with a graph Laplacian or geodesics, and therefore cannot leverage the known data to infer on the new data without retraining.

An advantage over typical deep learning approaches (e.g., non-graph neural networks) is that the data operated on need not be of the same type. That is, embodiments can compare image, to text, to graph, etc., provided at least one sample of each data type was tagged at training time.

One difference between some embodiments illustrated herein and typical graph neural network approaches lies in the construction of the underlying training graph. The underlying graph can leverage any number of models and the edge data directly encodes the information from the input model. Therefore, often an atlas index will preserve similarity of the underlying data type better than a traditional graph neural network which typically leverages learned local features without taking global information into account nor preserving the relative size of edge weights (which in this case are data similarity measures from the original model).

Referring now to FIG. 1, additional details are illustrated. FIG. 1 illustrates a first graph 102A and a second graph 102B. Each of these graphs uses different embedding spaces 104A and 104B respectively. The graphs 102A and 102B may have been generated during model generation and training in different data scopes. For example, a user may train a model based on a text data scope for graph 102A while training a model based on image data scope for graph 102B. This results in embedding spaces 104A and 104B that are contextually different.

For example, in some embodiments, FAISS, which is a similarity search tool, available from Facebook, Inc. of Menlo Park, CA may be used to abstract an embedding space by using a FAISS index, where primary keys are tracked to the FAISS index, and where tags are tracked to FAISS indices. Nonetheless, the different embedding spaces for different graphs are dissimilar.

In particular, embodiments insert the embeddings for a given graph into the corresponding FAISS index which allows for efficient nearest neighbors and distance searches. Embodiments also store unique identifiers for the content and any associated tags. Embodiments can then search between the embedding spaces for any shared tags or keys to establish mapping between points of different graphs.

FIG. 1 illustrates node 106A1 in graph 102A and node 106B2 in graph 102B. User input may be received indicating that node 106A1 is related to node 106B2 in some fashion. For example, a user may provide explicit input relating the nodes to each other. For example, a user may tag both nodes with the same or a similar tag. For example, a user may use a graphical tool such as Visual Studio available from Microsoft Corporation to view and interact with nodes in a model graph. Within the graphical tool, the user can apply tags to various nodes displayed in the tool. Thus, the user can add the same or similar tags to different nodes in different graphs to associate the nodes with each other.

In another example of providing explicit input, a user may graphically connect nodes from different graphs. For example, a user may add a pseudo edge, in a graphical tool, between nodes in different graphs. A pseudo edge is a user defined edge explicitly defined by the user as opposed to an edge created by training a machine learning model. In some embodiments, the user can assign edge weights or other characteristics to define the strength of relation between nodes from different graphs.

In another example of providing explicit input, a user may explicitly provide other input such as a user determined percentage of similarity, a user defined similarity of the nodes to a common tag or other concept, or other user input.

In some embodiment, implicit signals may be received from a user. For example, user searches using different neural networks and different associated graphs, but that are proximate in time (within some predefined threshold) will cause results to be output based on nodes in the graphs. Different nodes from different graphs that resulted in output to a user could be identified as being related to each other by virtue of their proximity in time with respect to being used by the user. For example, a user could perform a text search using a first graph, and a subsequent image search, proximate in time to the text search, using a second graph. Nodes from the first graph resulting in results for the text search and nodes from the second graph resulting from the image search could be identified as being related to each other. In one example, a user exploring results based on different nodes from different graphs causing the results, proximate in time within some predefined threshold, may cause the different nodes to be related. Other implicit signals may be based on user habits, time of day when a user performs a search, location of a user when a search is performed, networks used to perform a search, permissions granted to a user performing a search, etc.

In some embodiments, node relationships from different graphs can be identified from generic taxonomies. When the input data is too large to be sampled (for example, in some embodiments, 5-10% of the data) and manually indexed embodiments can leverage common data scraping techniques such as key words and pretrained visual models to help generate generic tags to perform an initial alignment. In this sense atlas indexing can be transformed into a semi-supervised approach where the supervision or human knowledge is coming from the upstream or pretrained models for more generic tags and does not necessarily require human input if human input was previously provided.

In any case, embodiments are able to track pairwise points sharing tags or other keys between different embedding spaces, which are then used to build a new model representing a plurality of graphs and embedding spaces with a single embedding space, as illustrated in more detail below.

Once node relationships from different graphs have been identified, nodes from different graphs can be represented in a combined machine learning graph neural network. For example, FIG. 2 illustrates a new graph 102C, which is a machine learning with combined nodes corresponding to nodes in the graphs 102A and 102B. For example, nodes 106C1 and 106C2 correspond to nodes 106A1 and 106B2 respectively. The nodes 106C1 and 106C2 are coupled together by an edge 108C1. This is as a result of the external input indicating that nodes 106A1 and 106B2 are related. Nodes 106C1 and 106C2 are in the same embedding space 104C. Thus, data in different graphs 102A and 102B with different embedding spaces 104A and 104B can be represented in a new graph 102C in the same embedding space 104C. This allows signal processing to be performed over data from different scopes in one respect but now being in the same embedding space in a new same scope. Thus, an improved computing system is implemented in the form of a new machine learning graph neural network that is capable of processing signals, such as search queries, over different scopes of data that are now implemented in the same embedding space. That is, previous computing systems were only able to process signals for different scopes separately, and then once results were obtained from the processing, the results could be combined. This may result in a combination of results where the results are disjoint and less relevant to each other, as separate processing was performed without regard to how the scopes relate to each other. New computing systems implemented herein allow the scopes to be combined in a new graph, for implementation of a new machine learning graph neural network. This allows a plurality of scopes to be processed together using a single machine learning graph neural network, resulting in more consistent results across the various scopes. Thus, improved search and data processing computing systems are implemented over previous systems.

Note, however, that other nodes in the combined machine learning graph may also be coupled via edges as a result of something other than user input. For example, FIG. 2 illustrates node 106C3 coupled to node 106C4, which is in turn coupled to node 106C2. This may occur for various reasons, such as due to automatic node and edge addition once edge connections have been identified by external input, or due to additional model training after connections have been identified by external input.

Embodiments can use an embedding and embedding space name to generate a k-nearest neighbors graph. Embodiments then check if any of the neighbors are contained in an atlas index 306 (see FIG. 3), which is a new machine learning graph neural network, to retrieve the trained graph neural network embeddings. Embodiments use a transformation of the weighted distances to use as barycentric coordinates to construct a common embedding from the known embeddings. The resulting embedding lies in the convex hull of the known embeddings which bounds the distances it lies away from its nearby content in the atlas index space as a function of its embedding space similarity.

That is, a graph neural network can be leveraged to use both geometric and topological information such a local distances and connectivity. By using user input to weight edges, embodiments can instill similarity in a new embedding space from the original input embedding spaces. By identifying similar points or shared labels through user input, embodiments can improve comparability of the shared embedding.

Figure 3:
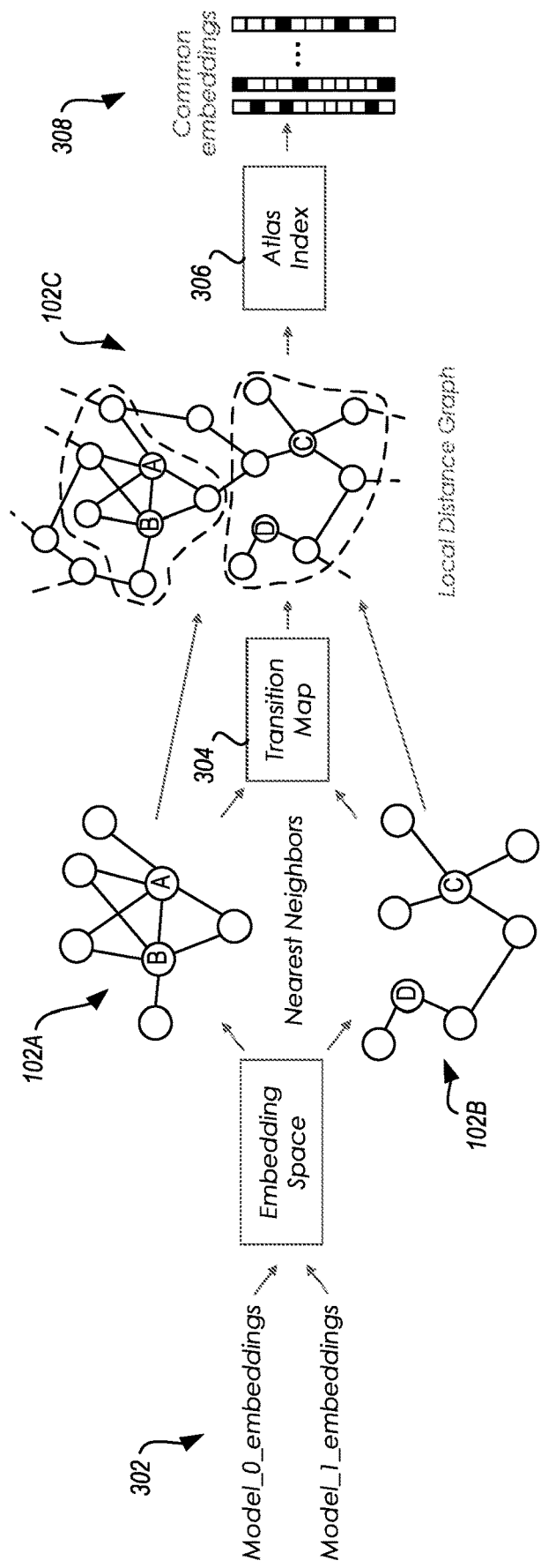
FIG. 3 illustrates an overview example of creating a new machine learning graph neural network.

Referring now to FIG. 3, an overview example is illustrated. FIG. 3 illustrates that input embeddings 302 are indexed. In some embodiments, this may involve indexing using a FAISS index which allows for efficient nearest neighbors and distance searches. In some embodiments, this may involve tracking primary keys to a FAISS index and tracking tags to FAISS indices. In particular, unique identifiers for content can be stored and tags can be associated. Embodiments can search between the embedding spaces for any shared tags or keys to establish maps between points and a quotient if necessary or desired. In particular, a transition map 304 tracks pairwise point sharing tags or keys between different embedding spaces. Using the transition map 304, a new graph 102C, which in some embodiments may be a local distance graph, can be created to correlate data from input graphs from different embedding spaces. The new graph 102C is used to create an atlas index 306 which is constructed from the output of an atlas model built from the new graph 102C with embedding 308 (having corresponding embeddings in the embeddings 302) that are comparable across the model of the atlas index 306. That is, the atlas index 306 is a new graph neural network. In particular, an atlas model produces a vector and then the atlas index 306 is used to look up similar vectors produced by the atlas model so that results can be returned quickly to a user.

Figure 4:
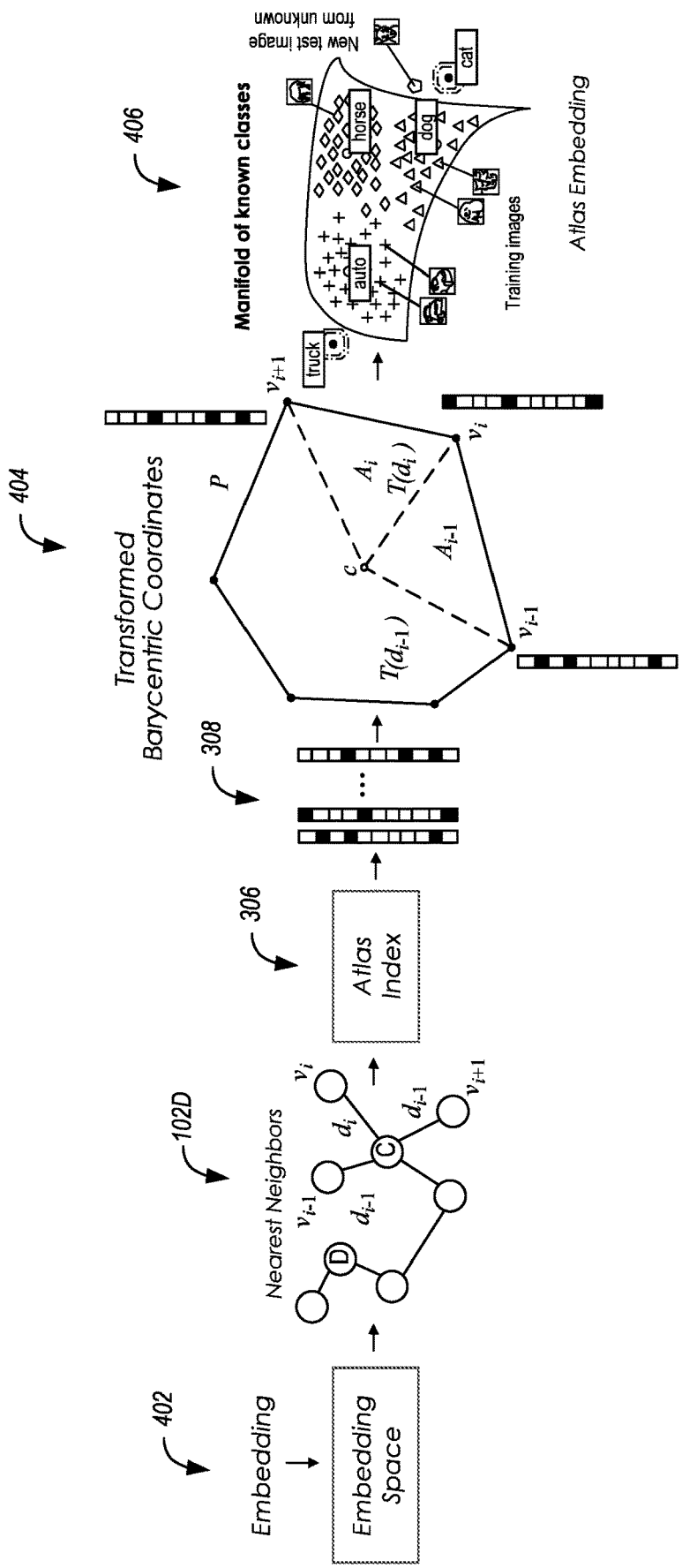
FIG. 4 illustrates an inference example using a new machine learning graph neural network.

The following, with reference to FIG. 4, now illustrates an inference example, where live data can be applied to the atlas index model to produce useful output. A machine learning system accesses an embedding 402 and embedding space name to generate the k-nearest neighbors graph 102D. The embedding 402 may be obtained from an external source, may be generated based on user input (such as search inputs) may be generated based on other input, etc.

Embodiments check if any of the neighbors in the nearest neighbor graph 102D have corresponding nodes in the atlas index 306 to retrieve the trained graph neural network embeddings 308. Again, in this example, FAISS indexing may be used as appropriate.

Some embodiments use a transformation of weighted distances to use as barycentric coordinates 404 to construct a common embedding from the known embeddings.

The resulting embedding lies in the convex hull 406 of the known embeddings which bounds the distances it lies away from its nearby content in the atlas index space as a function of its embedding space similarity. Conditional inference and machine learning principles can then be applied to produce useful outputs where data from different scopes can be processed in a unified fashion using the atlas index model.

Figure 5:
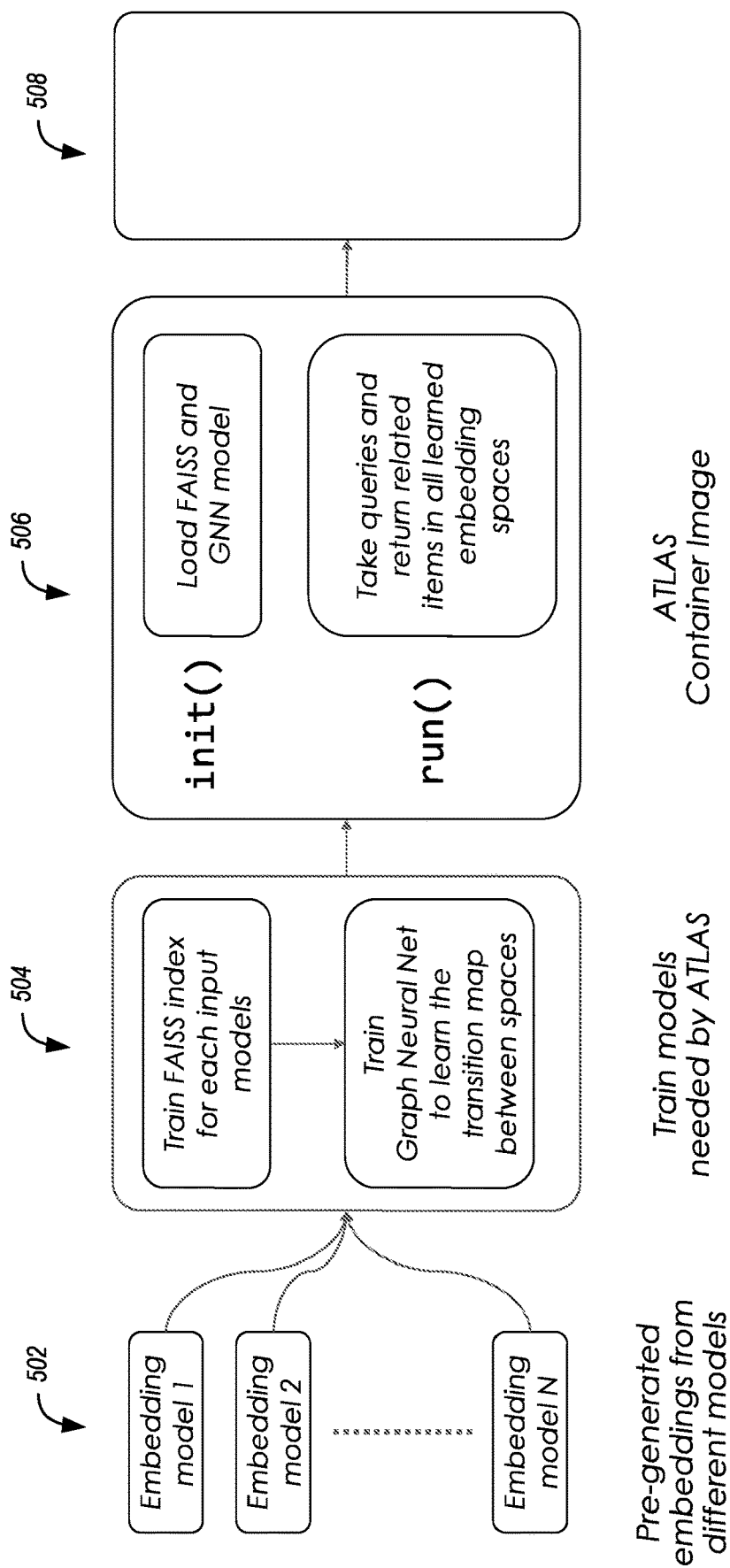
FIG. 5 illustrates an alternate representation of a process for creating and using a new machine learning graph neural network.

FIG. 5 illustrates an alternate representation of some embodiments of the invention. FIG. 5 illustrates pre-generated embeddings 502 from different models. As illustrated at 504 an index, such as a FAISS index, can be trained for each input model corresponding to the embeddings. Further, a graph neural network can be trained to learn the transition map between the various embedding spaces. As illustrated at 506, the trained graph neural network can then be used to perform various inference operations, as discussed previously. Note that FIG. 5 further illustrates that the graph neural network can be implemented in various other applications and platforms, as illustrated by the platform 508.

Figure 6:
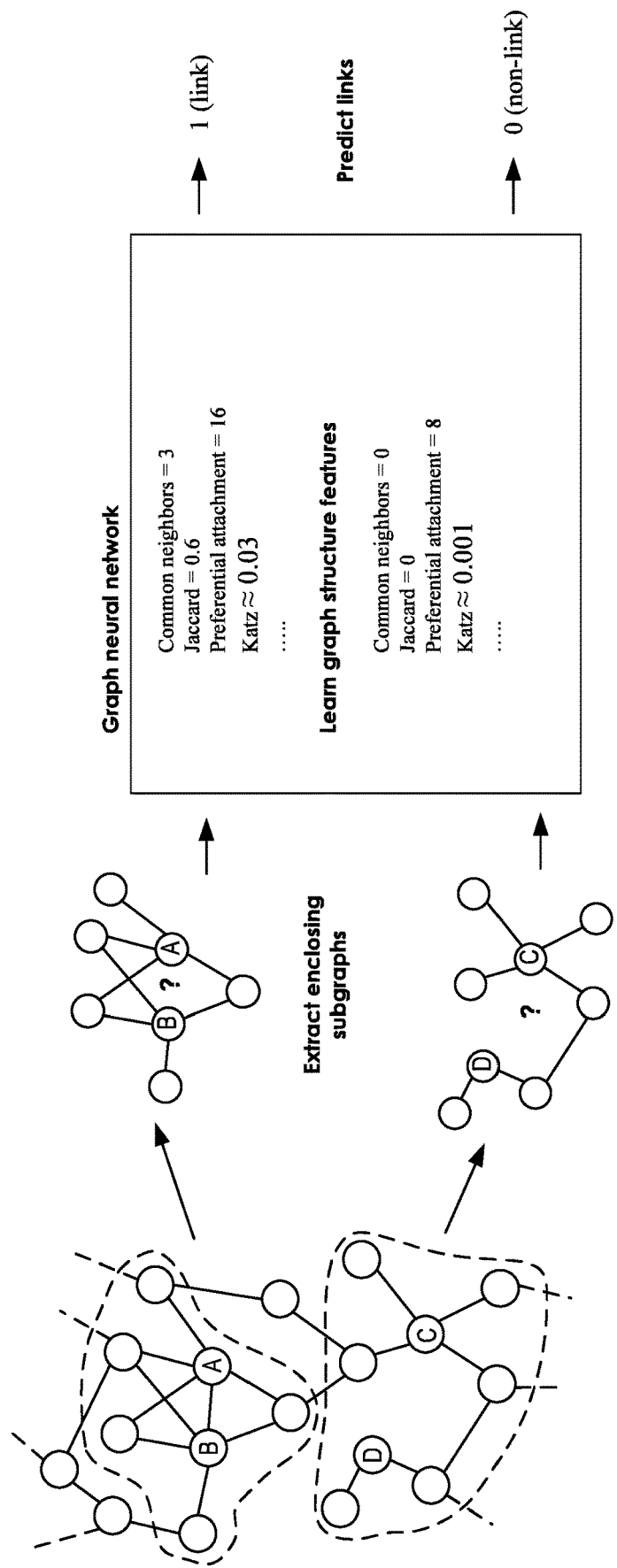
FIG. 6 illustrates a process for predicting graph links using a machine learning graph neural network.

Referring now to FIG. 6, an additional feature that may be implemented using some embodiments herein is illustrated. In particular, embodiments can be implemented to predict labels. In particular, as a graph link prediction problem embodiments can extend transition maps from user input to predict labels to associate with documents, images, meshes, videos, etc.

Various features and advantages can be accomplished using the functionality illustrated herein. For example, embodiments may be used to extend "explore" or "discover" functionality across data types to improve and/or create new machine learning models. For example, a unified explore or discover operation can be used on two or more data scopes together. For example, two or more types selected from the types, images, language, meshes, graphs, etc. can be selected for exploration in a single unified exploration operation.

Alternatively, or additionally, embodiments enable user input to have a direct impact the results of similarity. By enabling tagging, users can improve the responsiveness and personalization of machine learning systems (via manual tagging which will update transition maps).

Implementing embodiments illustrated herein can allow for modularization of "explore" and "discover" feature to minimize impact of changing single models.

Embodiments can be implemented to update models independently which will only affect mappings from a single embedding space. Due to the fact that in some embodiments, the mappings are at the tag level, an atlas index is compatible with any embedding as long as the taxonomy remains intact.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
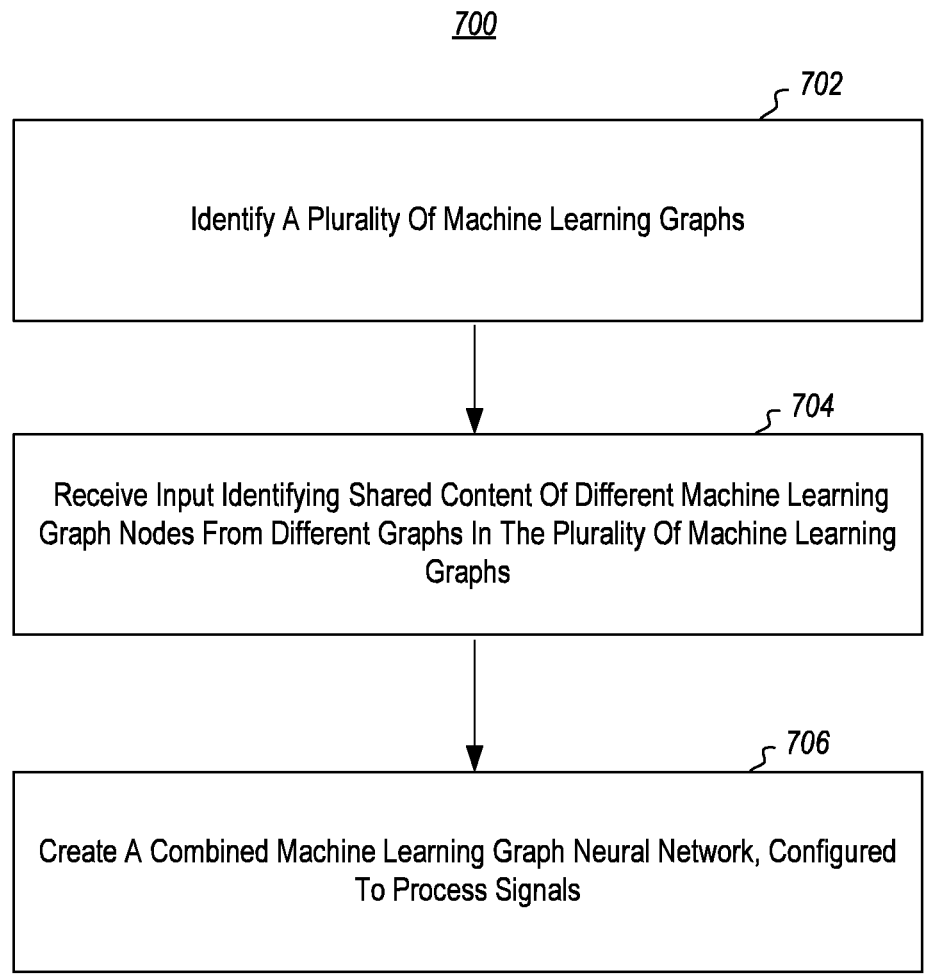
FIG. 7 illustrates a method of creating a machine learning graph neural network.

Referring now to FIG. 7, a method 700 is illustrated. The method 700 includes acts for creating a machine learning graph neural network configured to process signals. The method 700 includes identifying a plurality of machine learning graphs (act 702). Each of the machine learning graphs are for different types of data. For example, different machine learning graphs may be for images, graphs, sounds, language, text, chemical formulas, numbers, mathematical operations, etc.

The method 700 further includes receiving input identifying shared content of different machine learning graph nodes from different graphs in the plurality of machine learning graphs (act 704). For example, attention is directed to FIG. 1 where input can be received indicating that nodes 106A1 and 106B2 comprise shared content between the graphs 102A and 102B. In the example illustrated herein the content represented by nodes 106A1 and 106B2 is not identical, and thus is represented in the new graph 102C by a weighted edge 108C1 having a non-zero weight. The weight of the edge 108C1 defines the similarity of the data represented by the nodes 106A1 and 106B2, and also represented by nodes 106C1 and 106C2.

The method 700 further includes creating a combined machine learning graph neural network, configured to process signals (act 706). The plurality of machine learning graphs are used to create the combined machine learning graph based on the shared content. In particular, the combined machine learning graph neural network includes nodes corresponding to nodes in the plurality of machine learning graphs. For example, nodes 106A1 106B2, and 106A3 correspond to nodes 106C1, 106C2, and 106C3. Outputs from the combined machine learning graph neural network comprise outputs generated based on relationships of nodes in the combined machine learning graph, including nodes corresponding to nodes in different machine learning graphs in the plurality of machine learning graphs. For example, an output of a machine learning graph neural network based on the graph 102C may be based on a traversal of the graph that includes traversal of nodes 106C1 and 106C2. Thus, rather than in previous systems where output may be obtained from traversal of graph 102A and separately traversal of graph 102B, where the outputs are later combined, in the present example, outputs may be based on a traversal of graph 102C.

The method 700 may be practiced where the combined machine learning graph neural network normalizes vectors from the machine learning graphs in the plurality of machine learning graphs into a normalized space relative to the combined machine learning graph neural network. Indeed, in some embodiments, embedding vectors from different input graphs may be highly dissimilar to point of being seemingly irrelevant with respect to each other without external identification of shared content. For example different vectors from different input graphs, even for shared content nodes, may be beyond a predetermined threshold vector distance, and indeed may have a vector distance that indicates no statistically relevant relationship. In a combined machine learning graph, nodes for the same data will have a closer vector distance.

The method 700 may further include identifying similarity of nodes from different graphs based on the shared content of different machine learning graph nodes. For example, similarity of data for nodes 106A3 and 106C3 versus nodes 106B4 and 106C4 can be identified using the graph 102C.

The method 700 may further include using the shared content of different machine learning graph nodes to identify distances between nodes in the combined machine learning graph. Thus, for example, a vector distance between nodes 106C3 and 106C4 could be identified based on the shared content of nodes 106C1 and 106C2.

The method 700 may be practiced where receiving input identifying shared content of different machine learning graph nodes comprises input from a source external to the graphs themselves. For example, as discussed above, user input, user searches, user contextual interactions, etc., may be used as external input to identify shared content between different machine learning graphs.

The method 700 may be practiced where the types of data comprise at least two of text, images, video, audio, chemical maps, geographic location information, particular languages, or shapes.

The method 700 may be practiced where the input identifying shared content of different machine learning graph nodes from different graphs in the plurality of machine learning graphs comprises explicit signals from a user. For example, this may include a user tagging data, a user graphically connecting nodes in a graphical tool. In some such embodiments, the user may identify similarity of nodes by defining a distance, setting a percentage of similarity, using graphical interface elements such as sliders knobs, etc.

The method 700 may be practiced where the input identifying shared content of different machine learning graph nodes from different graphs in the plurality of machine learning graphs comprises implicit signals from a user. For example, this may include user searches proximity in time, user habits, application usage similarity context, etc.

The method 700 may be practiced where the input identifying shared content of different machine learning graph nodes from different graphs in the plurality of machine learning graphs comprises generic taxonomies.

The method 700 may further include performing additional training on the combined machine learning graph neural network using additional training signals.

The method 700 may further include performing additional training on the combined machine learning graph neural network until forming additional connections are minimized according to some predetermined measure, and then using the combined machine learning graph neural network to exploit content for the combined machine learning graph neural network.

Further, the methods and/or neural networks may be practiced and/or implemented by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. For example, a machine learning graph neural network may be constructed from processors configured using computer executable instructions to implement the functionality of the machine learning graph neural network. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of creating a machine learning graph neural network configured to process signals, the method comprising:
    identifying a plurality of machine learning graphs, where each of the machine learning graphs is for a different type of data;
    receiving input identifying shared content that indicates a first node of a first machine learning graph in the plurality of machine learning graphs is related to a second node of a second machine learning graph in the plurality of machine learning graphs wherein input comprises at least one of explicit signals from a user or implicit signals from the user; and
    creating a combined machine learning graph neural network, configured to process signals, using the plurality of machine learning graphs based on the shared content, wherein:
        the combined machine learning graph neural network comprises the first node from the first machine learning graph and the second node from the second machine learning graph, resulting in the first node now being in a same embedding space as the second node, a weighted edge connects the first node with the second node, the weighted edge is structured to enable traversal from nodes of the first machine learning graph to nodes of the second machine learning graph by traversal through: the first node, the weighted edge, and the second node, and as a result of the weighted edge connecting the first node with the second node, the combined machine learning graph neural network is structured to process data from different scopes using the same embedding space.

2. The method of claim 1, wherein the combined machine learning graph neural network normalizes vectors from the machine learning graphs in the plurality of machine learning graphs into a normalized space relative to the combined machine learning graph neural network.

3. The method of claim 1, further comprising identifying similarity of nodes from different machine learning graphs based on the shared content.

4. The method of claim 1, further comprising using the shared content of to identify distances between nodes in the combined machine learning graph.

5. The method of claim 1, wherein the different types of data comprise at least two of text, images, video, audio, chemical maps, geographic location information, particular languages, or shapes.

6. The method of claim 1, wherein the explicit signals from the user comprise at least one of tagging the first and second node with the same or similar tag, or a pseudo edge.

7. The method of claim 1, wherein the implicit signals from the user comprise at least one of user habits, time of day when a search is performed, location of the user when a search is performed, networks used to perform a search, or permissions granted to perform a search.

8. The method of claim 1, the method further comprising performing additional training on the combined machine learning graph neural network using additional training signals.

9. The method of claim 1, the method further comprising performing additional training on the combined machine learning graph neural network until forming additional connections are minimized according to some predetermined measure, and then using the combined machine learning graph neural network to exploit content for the combined machine learning graph neural network.

10. The method of claim 1, further comprising embedding each vertex of the combined machine learning graph neural network with a positional-aware graphical neural network.

11. The method of claim 1, further comprising storing unique identifiers for content or any tags associated with each node.

12. The method of claim 1, further comprising predicting labels based on either the explicit signals from a user or implicit signals from a user.

13. A computer system comprising:
one or more processors; and
one or more computer-readable media having stored thereon instructions that are executable by the one or more processors to cause the computer system to:
identify a plurality of machine learning graphs, where each of the machine learning graphs is for a different type of data;
receive input identifying shared content that indicates a first node of a first machine learning graph in the plurality of machine learning graphs is related to a second node of a second machine learning graph in the plurality of machine learning graphs, wherein the input comprises at least one of explicit signals from a user or implicit signals from the user; and
create a combined machine learning graph neural network, configured to process signals, using the plurality of machine learning graphs based on the shared content, wherein:
the combined machine learning graph neural network comprises the first node from the first machine learning graph and the second node from the second machine learning graph, resulting in the first node now being in a same embedding space as the second node,
a weighted edge connects the first node with the second node,
the weighted edge is structured to enable traversal from nodes of the first machine learning graph to nodes of the second machine learning graph by traversal through: the first node, the weighted edge, and the second node, and
as a result of the weighted edge connecting the first node with the second node, the combined machine learning graph neural network is structured to process data from different scopes using the same embedding space.

14. The computer system of claim 13, wherein the combined machine learning graph neural network normalizes vectors from the machine learning graphs in the plurality of machine learning graphs into a normalized space relative to the combined machine learning graph neural network.

15. The computer system of claim 13, wherein the instructions are further executable to cause the computer system to identify similarity of nodes from different machine learning graphs based on the shared content.

16. The computer system of claim 13, wherein the instructions are further executable to cause the computer system to use the shared content to identify distances between nodes in the combined machine learning graph.

17. The computer system of claim 13, wherein the explicit signals from the user comprise at least one of tagging the first and second node with the same or similar tag, or a pseudo edge.

18. The computer system of claim 13, wherein the implicit signals from the user comprise at least one of user habits, time of day when a search is performed, location of a user when a search is performed, networks used to perform a search, or permissions granted to perform a search.

19. A method comprising:
identifying a first machine learning graph and a second machine learning graph, wherein the first machine learning graph includes at least a first node operating in a first embedding space, and wherein the second machine learning graph includes at least a second node operating in a second embedding space;
determining, based on user input, that the first node is related to the second node; and
creating a combined machine learning graph by combining the first machine learning graph with the second machine learning graph, wherein:
the combined machine learning graph uses a common embedding space despite the first machine learning graph and the second machine learning graph previously operating in different embedding spaces;

combining the first machine learning graph with the second machine learning graph is performed by using a weighted edge to connect the first node with the second node, the weighted edge is structured to enable traversal from nodes of the first machine learning graph to nodes of the second machine learning graph by traversal through: the first node, the weighted edge, and the second node, and as a result of the weighted edge connecting the first node with the second node, the combined machine learning graph is structured to process data from different scopes using the common embedding space.

20. The method of claim 19, wherein the user input comprises a percentage of similarity or a defined similarity of the nodes to a common tag or key.

* * * * *